United States Patent [19]
Graves et al.

[11] Patent Number: 5,527,170
[45] Date of Patent: Jun. 18, 1996

[54] RUBBER CURING BLADDERS HAVING SELF RELEASE OR LOW ADHESION TO CURING OR CURED HYDROCARBON RUBBERS

[75] Inventors: Daniel F. Graves, Clinton; William L. Hergenrother, Akron, both of Ohio

[73] Assignee: Bridgestone Corporation, Tokyo, Japan

[21] Appl. No.: 358,740

[22] Filed: Dec. 19, 1994

Related U.S. Application Data

[60] Division of Ser. No. 222,154, Apr. 4, 1994, Pat. No. 5,385,459, which is a continuation-in-part of Ser. No. 906,095, Jun. 29, 1992, abandoned.

[51] Int. Cl.$^6$ .......................... B29C 35/00; B29D 30/00; C08L 9/00; C08L 13/00
[52] U.S. Cl. .......................... 425/52; 425/43; 264/315; 525/64; 525/67; 525/185; 525/186; 525/187
[58] Field of Search .............................. 525/64, 67, 186, 525/187, 185; 425/43, 52; 264/315

[56] References Cited

U.S. PATENT DOCUMENTS 5,385,459   1/1995   Graves .................................. 452/52

*Primary Examiner*—David Buttner
*Attorney, Agent, or Firm*—Daniel N. Hall

[57] ABSTRACT

Hydrocarbon polymers with grafts of polyethers, polylactones, or polyesters from the reaction of phosgene with glycols having from 1 to 4 carbon atoms are disclosed as having good release properties or low adhesion to hydrocarbon rubber materials. The hydrocarbon backbone polymers include EPDM, hydrogenated polybutadiene, and hydrogenated poly(styrene-butadiene) all said polymers having pendant succinic anhydride groups or brominated p-methylstyrene-isobutylene copolymers. The above-referenced graft copolymers along with butadiene-acrylonitrile rubber or epichlorohydrin polymers or copolymers are described as useful polymers to make self-release curing bladders or sleeves for use in making molded articles such as pneumatic tires.

23 Claims, No Drawings

RUBBER CURING BLADDERS HAVING SELF RELEASE OR LOW ADHESION TO CURING OR CURED HYDROCARBON RUBBERS

CROSS-REFERENCE

This is a division of application Ser. No. 08/222,154, filed on Apr. 4, 1994, of Daniel F. Graves et al. for RUBBER CURING BLADDERS HAVING SELF RELEASE OR LOW ADHESION TO CURING OR CURED HYDROCARBON RUBBERS, now U.S. Pat. No. 5,385,459, which is a CIP of Ser. No. 07/906,095, filed on Jun. 29, 1992, of Daniel F. Graves et al., now abandoned.

FIELD OF INVENTION

Polymers useful in making curing bladders or sleeves (used primarily to manufacture (more specifically cure or vulcanize) pneumatic tires) are described. These polymers must have good heat stability and physical properties such that they can be inflated during use and not rupture. The polymers described are butadiene acrylonitrile copolymers, epichlorohydrin polymers and copolymers, and graft copolymers. The graft copolymers have backbones of brominated p-methylstyrene-isobutylene copolymer, ethylene-propylene terpolymer, substantially hydrogenated polybutadiene, and/or substantially hydrogenated styrene-butadiene rubber. The grafts are various polyethers, polyesters from cyclic lactones, and polycarbonates made from phosgene and glycols. These polymers when used in a curing bladder formulation reduce or eliminate the need for a release agent to prevent adherence of the bladder to the cured tire.

BACKGROUND

Inflatable rubber bladders are used in machines for assembling, forming and curing pneumatic tires. These bladders are typically made from isobutylene rubbers especially when used at higher temperatures such as from 100° to 150° C. Isobutylene polymers are preferred over diene based polymers because they are inherently more resistant to oxidation at the above-recited cure temperatures typically used and often required for forming tires. This is because of the relatively low levels residual unsaturation available for crosslinking in isobutylene polymers (butyl rubber) compared to diene-based polymers. Adhesion of the cured tires to the rubber bladders is generally avoided by applying a liquid silicone-based lubricant either to the bladder or the tire components that are to be in contact with the bladder.

The need to apply a lubricant (also called dope) to the bladder tire interface slows the tire manufacturing process. Lubricants as used herein define liquids that do not crosslink under the conditions used to cure tires (i.e., 100°–180° C.). Excessive lubricant or the transfer of lubricant can discolor the tires or contaminate other surfaces where bonding is desired. Insufficient lubricant results in bonding of the bladder to the tire at the tire-bladder interface. When this interface bond is broken or torn when removing the cured tire, this can cause defects in the tire, roughens the bladder surface, or can promote bladder failure.

Bladders are used in curing presses to press the tread and sidewall regions of the tire outwardly against the mold surface during tire manufacturing. These bladders are filled with a heated fluid (preferably steam) to help speed the curing process of the tire. The high potential elongation of the bladder or sleeve (i.e. greater than 300 percent) allows the bladder to stretch and conform during tire curing and allows the bladder to stretch while tearing away from the molded tire.

Other inflatable bladders and sleeves have found uses in other rubber forming and curing processes. These similarly suffer from the necessity of supplying a lubricant at the interface between the bladder and the hydrocarbon component to be cured.

SUMMARY OF THE INVENTION

Polymers and molded polymer compositions are described having reduced natural adhesion (non-stick characteristics) to tire compounds, butyl rubber inner-liners, and other hydrocarbon polymer compositions. Inflatable monolayer membrane curing bladders made from these polymers require less interface lubricant or can be used without interface lubricant when used in molding and curing (e.g., vulcanization) of hydrocarbon polymer compositions such as pneumatic tires. These polymers disclosed herein have good release properties from curing rubber compositions (e.g. isobutylene polymer based tire innerliners) and thus can be monolayer membranes rather than laminates as sometimes taught in the prior art. The polymers used to make the bladders have polar components in the backbone or have polar grafts that contribute to this tendency to not adhere to the hydrocarbon polymers.

DETAILED DESCRIPTION OF THE INVENTION

Several polymers and graft copolymers have been developed that have the physical properties required of an inflatable bladder or sleeve for use in curing rubber (e.g., tires) and show the unique property of little or no adhesion to a typical cured hydrocarbon based polymer when said hydrocarbon-based polymer is cured in contact with the bladder or sleeve material. The polymers have polar type monomers in the backbone or grafted to the backbone which impart to the rubber compound a tendency not to adhere to hydrocarbon polymers.

The bladders or sleeves of this invention are desirably monolayer membranes (i.e. the exterior surfaces and the bulk of the bladder are essentially the same composition). As is common to the curing bladder art, one can apply non-bonding liquid lubricants to the surfaces of the bladder, but these are not required for the effective release of the bladder or sleeve surface from the cured hydrocarbon rubber composition. Thus, desirably, the bladder or sleeves of this invention do not have crosslinked surfaces of polysiloxanes or polyurethanes, or the like. Crosslinked is used to define polymers which are chemically bonded together with similar molecules or with the bladder or sleeve substrate composition such that chemical bonds need to be broken to remove the composition from the surface of the bladder or sleeve.

Graft copolymers whose backbone is isobutylene copolymers with at least para-methylstyrene are advantageously used for this application. Desirably, these copolymers are made without using optional diene monomers of 4 to 8 carbon atoms. These polymers are desirably high average molecular weight such as from about 75,000 and up, desirably from about 75,000 to about 2,000,000, and preferably from about 100,000 to about 500,000. These copolymers can be brominated by free radical bromination reactions which results in the selective replacement of the hydrogens on the para-methyl group of para-methylstyrene by a bromine atom. During the bromination reaction, the weight percent bromine developed in the polymer for this application is from about 0.1 to about 17, desirably from about 0.2 to about 8.0 and preferably about 0.5 to about 2.5 percent.

The weight percent of para-methylstyrene in the backbone for this application is about 0.1 percent by weight to about 30 percent by weight, desirably from about 1 weight percent to about 25 weight percent, and preferably about 2 weight percent to about 20 weight percent of the copolymer of isobutylene and p-methylstyrene. Increasing amounts of para-methylstyrene in the copolymer increases its modulus and Tg. The bromination of the para-methyl group creates a grafting site on the backbone and also serves as a crosslinking site. The amount of p-methylstyrene can be varied independently from the amount of bromination of said methyl group as long as the total replaceable bromine atoms on the backbone are sufficient for grafting and crosslinking. These polymers are commercially available from Exxon as XP-50 in their brominated form.

Said copolymers of isobutylene and p-methylstyrene are cationically polymerized by Exxon. The $r_1$ value for isobutylene is reported as 1, while the $r_2$ value for p-methylstyrene is reported as approximately 1.4. Thus, procedures for isobutylene polymerizations can be easily modified to produce copolymers. Slurry copolymerizations are also reported for this copolymer system. Radical bromination creates the brominated form of the isobutylene-p-methylstyrene copolymer. The bromination is reported to occur in solid phase, slurries, or solutions.

The polar polymers reacted with and desirably grafted onto the brominated para-methylstyrene isobutylene copolymer-or later specified maleic anhydride modified polymers can be any alkylene-oxide polymer (polyethers) or polyether copolymers having from 1 to 4 carbon atoms per repeat unit; or polycarbonates made from phosgene and glycols having 1 to 4 carbon atoms per glycol; or polyesters from ring opening polymerizations of cyclic lactones having from 4 to 5 carbon atoms per repeat unit. The average molecular weight of said polar polymers before grafting can be from about 100 to about 20,000, desirably about 200 to about 15,000, and preferably from 400–5,000. Polyether polymers and copolymers can be made from ethylene oxide, propylene oxide, tetrahydrofuran, etc. The polar polymers used for grafts can be branched or linear, but linear polymers are preferred. The polar polymers can be blended by type or by molecular weight. The alkyleneoxide polymers can be of one molecular weight or blends of different alkylene oxides or of different molecular weights or both. The polymers can have multiple chain ends reactive with the brominated para-methyl-styrene but polymers with a single chain end capable of grafting to the backbone polymer are preferred. The chain ends reactive with the para-methylstyrene are desirably hydroxyl groups.

The reaction and grafting of the brominated-para-methylstyrene-isobutylene with the polar polymers can be accomplished by melt blending the two polymers in the presence of acid scavengers such as oxides, carbonates, and hydroxides of Mg, Zn, Ca, and Ba. The reaction and grafting of said polar polymers through nucleophilic substitution of the polar polymer chain end for the bromo group of the methylstyrene can desirably be conducted in a Banbury or other mixer at temperatures from about 50° C. to about 180° C., and preferably from about 100° C. to about 150° C. The other compounding ingredients for a rubber compound can be added simultaneously with grafting of polar polymers or as a separate step.

The amount of polar polymers reacted and potentially grafted is from about 2 to about 50 or 100, desirably from about 5 to about 30, and preferably from about 10 to about 20 parts by weight based on 100 parts by weight of the brominated p-methylstyrene-isobutylene copolymer and the polar polymers. The rubbers compounded into a molded article can be a blend of said reaction product of the brominated p-methylstyrene-isobutylene copolymer and polar polymers (grafted copolymer) and regular brominated p-methylstyrene-isobutylene copolymer, EPDM, and other polymers such that from about 5 to about 100 weight percent of this rubber is graft copolymer, and desirably about 5 to about 35 percent of the rubber is graft copolymer. The brominated p-methylstyrene-iso-butylene copolymer, EPDM, hydrogenated polybutadiene, or hydrogenated SBR polymers can be used from 0 to about 95 weight percent, and desirably from about 65 to about 95 weight percent of the rubbers used to make molded articles. Thus, the molded article can be from 2 to about 40, desirably from about 5 to about 30 weight percent, and preferably about 10 to about 20 weight percent of said polar polymers based on all the rubbers used in the composition.

Another suitable polymer backbone for this invention is ethylene-propylene-diene copolymers (EPDM) (also known as ethylene-propylene terpolymer). These are well known to the art and are from about 30 to about 80, and desirably from about 50 to about 75 weight percent ethylene. The second monomer can be any alpha unsaturated monoolefin of 3 to 12 carbon atoms with propylene being the preferred monomer. The weight percent of said alpha unsaturated monoolefin in the copolymer is from about 20 to about 70 and desirably about 25 to about 50. The diene is a nonconjugated diene having from about 6 to about 12 carbon atoms. Examples of dienes are dicyclopentadiene, 1,4-hexadiene, and ethylidene norbornene.

The weight percent unsaturation from diene in said EPDM is about 0.1 to about 10, desirably about 0.2 to about 5.0, and preferably about 0.4 to about 2.5. The molecular weight of the EPDM is from about 75,000 to about 500,000 and desirably from about 150,000 to about 400,000. Alternatively, a blend of EPDM polymers of different molecular weights can be used.

Another suitable polymer backbone for this invention is polybutadiene (PBD) or poly (styrene-butadiene) copolymer (SBR) that have been hydrogenated to remove from about 90 to about 99.5 percent and desirably 95–99.5 percent of the backbone unsaturation. The average molecular weight of these polymers is from about 75,000 to about 500,000, and desirably from about 150,000 to about 400,000. The mole ratio of styrene to butadiene in the SBR can vary from about 1:50 to about 1:1. These polymers may contain minor amounts (less than 10, 20, or 30 mole %) of other unsaturated copolymerizable comonomers having 2 to 18 carbon atoms and heteroatoms of oxygen, nitrogen, and hydrogen. The words hydrogenated SBR or hydrogenated polybutadiene will be used to represent these substantially (e.g. greater than 70, 80, 90 and 95 percent) hydrogenated polymers in this specification.

The EPDM, hydrogenated polybutadiene and hydrogenated SBR backbones for this invention are modified by reacting maleic anhydride with the unsaturation in the polymers. This reaction of maleic anhydride with a monomeric olefin is well known to organic chemistry as the "Ene" synthesis or reaction. Further information on this reaction is in standard textbooks such as J. March, *Advanced Organic Chemistry* 3rd Ed, John Wiley & Sons: New York, p. 711. This reaction creates succinic anhydride pendant groups on the polymer backbone. The amount of maleic anhydride reacted with the various polymer backbones can be from about 1 to 50, desirably from about 1 to about 20, and preferably from about 2 to about 10 parts by weight per one hundred parts of backbone rubber.

Similar functionalized polymers to the polymers modified with maleic anhydride through the "Ene" reaction are hydrogenated polymers of polybutadiene, said EPDM or said hydrogenated poly (styrene-butadiene) (SBR) modified with maleic anhydride in the presence of free radical sources. These reactions are conventionally done in hydrocarbon solvents at 50°–180° C. for 0.1 to 24 hours using from about 0.01 to about 5 parts by weight free radical initiators per 100 parts rubber. The amount of maleic anhydride can be from about 1 to about 100, desirably from about 1 to about 20, and preferably from about 2 to about 10 parts by weight per 100 parts by weight rubber. The free radical sources are the free radical initiators of peroxides, azo initiators, persulfates, and the like.

These polymers modified using free radical initiators with maleic anhydride can be used interchangeably for the products of the "Ene" reaction mentioned above to serve as a backbone for grafting reactions with the polar polymers already described. The reaction with maleic anhydride creates grafts of pendant anhydrides from the polymer backbone that can serve as the grafting site for the esterification with the polar polymer end groups. One such material made is from an EPDM backbone is available commercially from Uniroyal as Royaltuf™ 465.

The polar polymers previously described as material to be grafted to the brominated-para-methyl-styrene-isobutylene backbone can be used with the above products of the "Ene" reaction or maleic anhydride modified polymers of hydrogenated polybutadiene, hydrogenated SBR, or EPDM. The grafting of the polar polymers to the backbone polymers are conducted by melt blending the backbone polymers with the polar polymers at 90° to 220° C., desirably from about 110° to about 180° C. and preferably from about 120° to about 160° C. for times from 1 minutes and longer, preferably from about 2 minutes to about 10 minutes. In this process, the anhydride groups created by the grafting of maleic anhydride onto the polymer backbone reacts with the hydroxyl group of the polar polymers forming an ester linkage. The composition of the grafted copolymers from EPDM, hydrogenated polybutadiene, or hydrogenated SBR by the "Ene" process or free radical source plus maleic anhydride process are from about 2 to about 50, desirably about 5 to about 30, and preferably about 10 to about 20 weight percent polar polymers which are grafted onto the rubbery backbone. The polar polymers may be used in amounts from about 2 to about 100 parts by weight per 100 parts by weight of said ethylene-propylene terpolymer or substantially hydrogenated polybutadiene, or substantially hydrogenated styrene-butadiene copolymer rubber.

The rubbers compounded into stocks for making molded rubber articles need not be 100 percent of said polymers grafted with polar polymers. The grafted copolymer can be from about 2 percent to about 100 percent, desirably about 5 to about 25 weight percent of the rubber in the stock. EPDM or hydrogenated polybutadiene or hydrogenated SBR can be up to 98 weight percent and desirably from about 75 to about 95 weight percent of the rubber in a molded article. The molded article can be have from about 2 to about 40, and desirably from about 5 to about 30 weight percent and preferably about 10 to about 20 weight percent of said polar polymers based on all the rubbers used in the composition.

Another group of suitable polymers useful in this invention are the various epichlorohydrin elastomers. Such materials can desirably be a homopolymer of epichlorohydrin or a copolymer with ethylene oxide, allyl glycidyl ether or both. The amount of ethylene oxide in these copolymers can desirably vary from about 1 to about 35 weight percent and desirably from about 3 to about 30 weight percent. The amount of allyl glycidyl ether can be from about 1 to about 5 weight percent of the copolymer. The amount of epichlorohydrin can vary from about 63 to about 99 weight percent of the copolymer. These polymers are made from by cationic, coordination polymerization mechanisms and commercially available from Hercules, Inc.; Osaka Sada Co., Ltd.; and Nippon Zeon Co., Ltd. The average molecular weights useful for this application are from about 50,000 to about 500,000, desirably about 80,000 to about 250,000. These polymers have reduced adhesion to hydrocarbon rubber compositions.

Another group of suitable polymers useful for this invention is butadiene-acrylonitrile copolymers. These copolymers can be made by a variety of polymerization methods, but free radical emulsion polymerized polymers are preferred. The weight percent acrylonitrile in these copolymers is from about 18 to about 55, desirably about 25 to about 45, and preferably about 30 to about 40, with the residual being butadiene or blends of butadiene and optional monomers. Optional monomers are desirably present at less than 2, 10, 20 or 30 mole percent of all the monomers present. The optional monomers have at least one unsaturated carbon to carbon bond from 3 to 15 carbon atoms, and other atoms such as hydrogen, oxygen, and nitrogen, and optionally contain a second double bond or an aromatic ring. Butadiene-acrylonitrile heat stability is improved with a special antioxidant heat stabilizers such as the zinc salt of 2-mercaptobenzothiazole (Zetax) to keep the polymer from degrading at the use temperature. Such compounds are used at the concentration of 0.25 to about 2 parts per 100 parts by weight hydrocarbon rubber. The average molecular weight of the polymer for this invention is from about 50,000 to about 500,000, and desirably is from about 80,000 to about 250,000.

To be useful as curing bladders, all the above referenced polymers and graft copolymers must be formulated into rubber compounds with good elasticity, high strength, and good property retention after aging or use at high temperatures such as 100° C. to about 150° C. Thus the physical properties as recited below desirably are retained for at least 24 hours, 48 hours, 1 week, or one month at temperatures of 100°, 120°, 135°, or 150° C. Typical formulations for these compounds are well known to the art. High structure reinforcing carbon blacks are used in this invention to give higher modulus and better abrasion resistance. These carbon blacks are desirably high structure blacks having calculated ultimate particle sizes from about 20 to about 40 nanometer diameter and Iodine Numbers by ASTM methods of about 60 to about 160 mg/g. Oils are used to extend the polymers. These oils can be paraffinic, naphthenic, or aromatic. Antioxidants are used to prevent oxidative crosslinking or chain degradation of the polymers. The antioxidants effective in these compositions include paraphenylenediamines, hindered phenols, and polymerized quinolines. Commercial EPDM, hydrogenated SBR, brominated p-methylstyrene-isobutylene, SAN/EPDM blends or grafts, and hydrogenated PBD polymers can be blended with the polymers and copolymers of this invention. EPDM and the hydrogenated rubbers generally gives a composition higher resistance to oxidation in that these polymers have low residual unsaturation in the polymer backbone. Accelerators and curatives will be discussed individually for each of the graft copolymers or polymers.

The compounds are formulated to give an ultimate tensile strength of 1500 psi or more, a 300 percent modulus value of 500 to 1000 psi, a Shore A hardness of about 55 to about 70, and desirably of about 60 to about 65. These physical properties are required of the bladder or sleeve when installed in a curing press, and they are desirably retained during the useful life of the bladder or sleeve. Thus, when the bladder or sleeve degrades so these properties are not met, the bladder or sleeve is replaced. Depending on the size and shape of the bladder or sleeve, these tests may be performed on specimens cut from the bladder or sleeve, or when that is not possible, one would cure the same formulation used to make the bladder or sleeve under identical conditions as a flat sheet and test the flat sheet. It is also desirable that the tear strength at 170° C. be in excess of 100 psi and more desirably in excess of 200 psi.

The brominated para methylstyrene isobutylene copolymers reacted and grafted with polar polymers are cured with phenolic resins, sulfur, sulfur donor compounds, ZnO, and other resins reacting through the brominated methyl group on the methylstyrene. Sulfur donors are compounds like di-morpholino disulfide or dipentamethylenethiuram hexasulfide which can donate sulfur atoms. Magnesium oxide and to some extent the zinc oxide serve as acid scavengers picking up HBr generated from the reaction of the bromine coming off the methylstyrene groups. Additional alkylene oxide can be present in the formulation beyond the amount grafted to the backbone of the polymer. Liquid EPDM polymers are added to improve the tear strength of the composition. The oil used is typically a paraffinic or naphthenic oil as these are common to isobutylene based bladder formulation.

The polymers of modified EPDM, hydrogenated SBR modified with maleic anhydride and hydrogenated polybutadiene similarly modified with maleic anhydride subsequently reacted and grafted with polar polymers can be formulated with regular EPDM, hydrogenated SBR, hydrogenated PBD, and liquid EPDM into molded articles. Regular EPDM, hydrogenated SBR, or hydrogenated polybutadiene are from about 0 to about 98 and desirably about 50 to about 95 weight percent of the total rubbers used in the molded rubber articles. The modified polymers from EPDM, hydrogenated PBD or hydrogenated SBR grafted with the polar polymers are used in amounts from about 2 to about 100, desirably about 5 to about 50 weight percent of the total rubbery polymers used in molded articles. Stearic acid and zinc oxide act as internal lubricants for the formulation. This is a sulfur cured composition as there are unsaturation points in or pendant to the polymer chain. The preferred curing compounds are sulfur, sulfur donor compounds, peroxides, and sulfur cure accelerators. The sulfur donor compounds can be di-morpholino disulfide or dipentamethylene thiuram hexasulfide or the like. The combined amounts of these curatives per 100 parts by weight of rubbers is from about 0.2 to about 8, desirably from about 0.3 to about 6, and preferably about 0.4 to about 5 parts by weight.

The grafting of the polar polymers to the modified EPDM, modified hydrogenated SBR, or modified hydrogenated polybutadiene can be done separately from compounding the curable compound or can be accomplished simultaneously with the mixing of the carbon black, silica, oil, antioxidants, zinc oxide and stearic acid, etc.

The grafting is simply the reaction of the pendant anhydride groups with the hydroxyl group of the polar polymer to form an ester linkage. Subsequent to the grafting and homogenizing of the compound, the curative components can be added to the compound in the mixer or on a two roll mill.

The epichlorohydrin rubbers can be compounded into curable compounds with curatives of the ethylene-thiourea, mercaptothio-diazole, trithiocyanuric acid type and the like. One preferred curative is trimercaptotriazine. The amount of curative is from about 0.2 to about 5, and desirably from about 0.5 to about 2 parts by weight per one hundred parts by weight epichlorohydrin of rubber. The epichlorohydrin rubber can also compounded with barium carbonate, magnesium oxide, silicone oil, additional unreacted polar polymers such as polyethers, plasticizers, coumarone-indene resins and cure accelerators. The epichlorohydrin polymers are from about 20 to about 100 weight percent, desirably about 50 to about 100 weight percent, and preferably from about 75 to about 100 weight percent of the rubber used in a molded article.

The butadiene-acrylonitrile rubber can be compounded with typical compounding ingredients. A specific example is given in Table III. The butadiene-acrylonitrile is from about 20 to about 100 weight percent, desirably about 50 to about 100 weight percent, and preferably about 75 to about 100 weight percent of the rubber used in a molded article. The residual weight percentages may be the optional polymers in this specification or the rubbers of the recipe.

The above-referenced compounded rubbery polymers (either with polar components in the polymer backbone or with polar polymer grafts on hydrocarbon polymer backbones) can be formed into monomembrane curing bladders in a transfer mold. The typical procedure for molding is that the compound is extruded as a slug, bar, etc. The extrudate is mechanically spliced forming a ring. The ring of extrudate is put into the transfer mold where the compound is formed into a barrel shape of a curing bladder and crosslinked. Transfer molding temperatures are 340°–390° F. for 20–25 minutes with pressures of 1500 to 2000 psi.

As explained previously the rubber polymers are mixed in a Banbury or other internal mixers, or two roll mill with the fillers, plasticizers, oils, antioxidants, acid scavengers, and polar polymers until homogeneous. If a grafting reaction between a hydrocarbon backbone and the polar polymers is desired, it can be accomplished during this mixing step or prior to this step in a separate reaction.

After the initial blend is homogenous, then the curing agents are added. This is a standard compounding technique found in any basic rubber compounding book. The mixing temperatures subsequent to adding the curing agents are controlled to prevent premature crosslinking during the mixing stage. The compounded rubber stock is characterized regarding cure times by running a disc type curemeter plot at the desired curing temperature. Additional additives such as scorch inhibitors or cure accelerators can be added depending on the particular molding equipment used. The physical properties reported herein are from crosslinked molded articles for ASTM D-412 or molded sheets prepared for the peel force test.

The peel force test was designed to measure the adherence of a typical sulfur cured butyl rubber tubeless tire innerliner stock cured in physical contact under pressure to a rubber curing bladder monomembrane candidate. Two sheets, one of the experimental cured bladder candidate, the second of uncured conventional butyl rubber (polyisobutylene) tubeless tire innerliner compound, are molded for 20 minutes at 340° F. under 1000 psi pressure as a laminate. A small piece of Mylar® is used along one edge of the laminate between the two compounds so as to form a lip of non-adhered compounds to serve as clamping points for the peel test. After curing, the sample is removed from the press and the force to peel the two materials from each other, bladder candidate from innerliner compound, is measured by 180° peel test while the samples are still hot. Typical butyl rubber curing bladder materials have peel forces of in excess of 100 pounds per inch (ppi) and the peel surface is characterized by cohesive failure rather than interfacial failure. Cohesive failure means the two materials are well bonded such that the failure occurs in one of the compounds (internal tearing of the compound) rather than at the interface between the two compounds. This is why a lubricant or dope is required for conventional butyl rubber curing bladders.

When curing bladders are made from monolayer membranes of the polar polymers or polymers with polar grafts disclosed in this specification, they have low adhesion or no adhesion to the innerliner compound when tested accordingly to the peel test. The peel force is less than 20 lbs./in., desirably less than about 3 lbs./in. and preferably less than 1 lbs./in. A low peel force for the purpose of this application is less than 3 lbs./in. It is suggested that the more polar surface of the disclosed curing bladder compounds are less compatible with the innerliner compound than traditional butyl rubber (isobutylene polymers) bladder and this causes less adhesion of the compounds after curing of the innerliner compound.

The optional interface lubricants that may be used with this invention only temporarily modify the surface of the bladder in that the interface lubricants are liquids and not crosslinked to themselves or to the bladder or sleeves. These lubricants include polymeric silicones, polyols, clays, cellulose ethers, etc. which do not crosslink or chemically bind to the surface of the bladder or sleeve nor to other such polymers under the use and storage conditions of the bladder or sleeve.

The following examples serve to illustrate how the above listed polymers can be compounded into useful materials having low adhesion to curing or cured hydrocarbon formulations.

TABLE I

EXAMPLE OF BROMINATED COPOLYMER
p-METHYLSTYRENE-ISOBUTYLENE
REACTED WITH POLY(ETHYLENEGLYCOL)

| Sample | A | B | C | D |
|---|---|---|---|---|
| PEG-400 | 20 | 15 | 15 | 15 |
| XP-50BR | 100 | 85 | 80 | 60 |
| EPDM Rubber | — | — | — | 30 |
| Liquid EPDM | — | 15 | 20 | 10 |
| Carbon Black (HAF) | 60 | 60 | 60 | 60 |
| Antioxidant | 1 | 1 | 1 | 1 |
| Oil | 10 | — | — | 15 |
| MgO | 5 | 5 | 5 | 5 |
| Stearic Acid | 2 | 2 | 2 | 2 |
| Eurecamide | 2 | 2 | 2 | 2 |
| Curatives | | | | |
| ZnO | 0.75 | 0.75 | 0.75 | 0.75 |
| Sulfur Donor | 1.5 | 1.5 | 1.5 | 1.5 |
| Physical Properties | | | | |
| ML/4 @ 100° C. | 62 | 77 | 71 | 58 |
| Release | Yes | Yes | Yes | Yes |
| Peel Force (lbs/in) | 0 | 0 | 0 | 3 |
| Shore A Hardness 23° C. | 63 | 66 | 66 | 63 |
| Percent Compression Set 22 hrs 158° F. | 20.7 | 28.7 | 36.7 | 37.5 |
| Ring Stress Strain 25° C. ASTM D412 | | | | |
| 100% Modulus (psi) | 219 | 244 | 250 | 211 |

TABLE I-continued

EXAMPLE OF BROMINATED COPOLYMER
p-METHYLSTYRENE-ISOBUTYLENE
REACTED WITH POLY(ETHYLENEGLYCOL)

| Sample | A | B | C | D |
|---|---|---|---|---|
| 300% Modulus (psi) | 1075 | 1026 | 1005 | 624 |
| Tensile (psi) | 1709 | 1620 | 1417 | 1241 |
| % Elongation | 481 | 496 | 461 | 617 |
| Energy to break (psi) | 1629 | 1697 | 1395 | 1795 |
| Ring Stress-Strain 100° C. ASTM D412 | | | | |
| 100% Modulus (psi) | 148 | 139 | 134 | 122 |
| 300% Modulus (psi) | 672 | 580 | 554 | 366 |
| Tensile (psi) | 966 | 856 | 730 | 485 |
| % Elongation | 420 | 445 | 425 | 439 |
| Energy to break (psi) | 728 | 740 | 633 | 483 |
| Ring Stress-Strain after 2 days 150° C. ASTM D412 | | | | |
| 100% Modulus (psi) | 359 | 415 | 469 | 529 |
| 300% Modulus (psi) | 1302 | 1310 | 1345 | 1429 |
| Tensile (psi) | 1602 | 1569 | 1403 | 1507 |
| % Elongation | 436 | 391 | 374 | 375 |
| Energy to break (psi) | 1671 | 1450 | 1328 | 1453 |
| Ring Tear (lbs/in) | 60 | 77 | 75 | 59 |

XP-50BR is a brominated p-methylstyrene-isobutylene copolymer available from Exxon Chemical with 0.8% by wt. bromine, PEG 400 is 400 molecular weight poly(ethylene glycol).
Eurecamide is a mold release agent sold by Struktol as TR 131.

TABLE II

EXAMPLE OF MALEIC ANHYDRIDE MODIFIED EPDM

| Sample | E | F | G | H |
|---|---|---|---|---|
| Liquid EPDM Rubber | 0 | 0 | 10 | 0 |
| EPDM Rubber | 100 | 90 | 80 | 50 |
| RT-465 (Modified EPDM) | — | 10 | 10 | 50 |
| Silica | 20 | 20 | 20 | 20 |
| Carbon Black HAF | 30 | 30 | 30 | 30 |
| ZnO | 3 | 3 | 3 | 3 |
| Stearic Acid | 1 | 1 | 1 | 1 |
| Oil | 50 | 20 | 20 | 30 |
| Antioxidant | 1.0 | 1.0 | 1.0 | 1.0 |
| Si69 | 1.5 | 1.5 | 1.5 | 1.5 |
| PEG 8000 | — | 30 | 30 | 20 |
| Curatives | | | | |
| Accelerator I | 1.5 | 1.5 | 1.5 | 1.5 |
| Sulfur Donor | 2.0 | 2.5 | 2.5 | 3.0 |
| Accelerator II | 2.5 | 2.5 | 2.5 | 2.5 |
| Physical Properties | | | | |
| Release | No | Yes | Yes | Yes |
| Peel Force (lbs/in) | >20 | <3 | 0 | 0 |
| Ring Stress Strain 25° C. ASTM D412 | | | | |
| 100% Modulus (psi) | 420 | 378 | 367 | 304 |
| 300% Modulus (psi) | 1600 | 978 | 978 | 617 |
| Tensile (psi) | 3127 | 1764 | 1686 | 1251 |
| % Elongation | 545 | 503 | 496 | 617 |
| Energy to break (psi) | 3464 | 1865 | 1781 | 1820 |
| Ring Stress Strain 100° C. ASTM D412 | | | | |
| 100% Modulus (psi) | 300 | 218 | 207 | 97 |
| 300% Modulus (psi) | 1196 | 737 | 710 | 165 |
| Tensile (psi) | 1345 | 746 | 819 | 275 |
| % Elongation | 382 | 353 | 389 | 606 |
| Energy to break (psi) | 1050 | 564 | 669 | 453 |
| Ring Stress Strain. after 2 days 150° C. ASTM D412 | | | | |

TABLE II-continued

EXAMPLE OF MALEIC ANHYDRIDE MODIFIED EPDM

| Sample | E | F | G | H |
|---|---|---|---|---|
| 100% Modulus (psi) | 570 | 541 | 552 | 421 |
| 300% Modulus (psi) | 2527 | 1638 | 1702 | 895 |
| Tensile (psi) | 2775 | 2001 | 2049 | 1624 |
| % Elongation | 370 | 397 | 395 | 584 |
| Energy to break (psi) | 2047 | 1682 | 1733 | 2311 |

Accelerator I is Altax MBTS (benzothiazyl disulfide)
Accelerator II is TMTD (tetramethylthiuram disulfide)
RoyalTuf ™ 465 (RT-465) is EPDM reacted with maleic anhydride to create an EPDM backbone with succinic anhydride pendant groups. This is the modified EPDM used as a backbone for grafting polar polymers onto. This polymer is made and sold by Uniroyal.
Si69 is made by DeGussa Corp. It is bis(3-triethoxysilylpropyl)-tetrasulfane. It functions as a silica coupling agent.
PEG 8000 is poly(ethylene glycol) of molecular weight 8000.

TABLE III

EXAMPLE NITRILE RUBBER

| Sample | I |
|---|---|
| NBR Krynac ® 825 | 100 |
| Carbon Black HAF | 48 |
| Stearic Acid | 1 |
| ZnO | 5 |
| Castor Oil | 20 |
| Heat Stabilizer | 0.75 |
| Antioxidant | 2 |
| Antioxidant | 3 |
| CI Resin | 15 |
| Curatives | |
| Di-morpholino disulfide | 1.2 |
| Pre vulcanization inhibitor | 0.3 |
| Benzothiazyl disulfide | 0.75 |
| Tetraethylthiuram disulfide | .80 |
| Physical Properties | |
| ML/4 @ 100° C. | 33 |
| Release | Yes |
| Peel Force (lbs/in) | 0 |
| Shore A Hardness 23° C. | 60 |
| % Compression Set 22 Hrs @ 158° F. | 24.0 |
| Ring Stress Strain 25° C. ASTM D412 | |
| 100% Modulus (psi) | 221 |
| 300% Modulus (psi) | 721 |
| Tensile (psi) | 3064 |
| % Elongation | 841 |
| Energy to break (psi) | 5007 |
| Ring Stress Strain 100° C. ASTM D412 | |
| 100% Modulus (psi) | 126 |
| 300% Modulus (psi) | 450 |
| Tensile (psi) | 1500 |
| % Elongation | 681 |
| Energy to break (psi) | 2109 |
| Ring Stress Strain After Aging | |

| | 2 days 121° C. | 1 day 150° C. |
|---|---|---|
| 100% Modulus (psi) | 273 | 1169 |
| 300% Modulus (psi) | 1040 | — |
| Tensile (psi) | 3110 | 1432 |
| % Elongation | 742 | 159 |
| Energy to break (psi) | 4819 | 469 |
| Ring Tear @ 340° F. (lbs/in) | 220 | 220 |

NBR Krynac ® 825 is nitrile rubber, butadiene-acrylonitrile copolymer, made by Polysar.
CI resin is coumarone-indene processing resin.

TABLE III-continued

EXAMPLE NITRILE RUBBER

Post vulcanization inhibitor is Santoguard PVI (N-cyclohexylthio) phthalimide. It serves to retard scorch.
Heat stabilizer is Zetax.

TABLE IV

CONTROL EXAMPLE OF BUTYL RUBBER

| Sample | J |
|---|---|
| Butyl Rubber | 95 |
| Carbon Black | 48 |
| Stearic Acid | 0 |
| ZnO | 8 |
| Antioxidant | 0 |
| Castor Oil | 8 |
| Curatives | |
| Heat Reactive Phenolic Resin | 9.75 |
| Neoprene | 5 |
| Physical Properties | |
| ML/4 @ 100° C. | 75 |
| Release | No |
| Peel Force (lbs/in) | >100 rubber failure |
| Ring Tear @ 340° F. lbs/in | 220 |

Heat reactive phenolic resin is actually added with the carbon black and other ingredients before the final curative, which is neoprene rubber. Neoprene rubber serves to activate the cure system.

TABLE V

EXAMPLES EPICHLOROHYDRIN RUBBER

| Sample | K | L | M | N | O |
|---|---|---|---|---|---|
| Hydrin ™ | 100 | 100 | 100 | 100 | 70 |
| SAN/EPDM | 0 | 0 | 0 | 0 | 30 |
| BaCO₃ | 4 | 4 | 4 | 0 | 4 |
| MgO | 0 | 0 | 0 | 4 | 0 |
| Black HAF | 48 | 48 | 48 | 48 | 48 |
| Antioxidant | 1 | 1 | 1 | 1 | 1 |
| Antioxidant | 0.4 | 0.4 | 0.4 | 0.4 | 0.4 |
| Silicone Oil | 5 | 5 | 5 | 5 | 5 |
| CI Resin | 8 | 8 | 8 | 8 | 8 |
| Dioctyl Sebacate Plasticizer | 5 | 5 | 5 | 5 | 5 |
| Curatives | | | | | |
| Accelerator III | 1.0 | 1.0 | 1.0 | 1.0 | 1.0 |
| Trimercaptotriazine | 1.0 | 1.25 | 1.5 | 1.0 | 1.0 |
| Physical Properties | | | | | |
| ML/4 @ 100° C. | 44 | 41 | 42 | 34 | 68 |
| Release | Yes | Yes | Yes | Yes | Yes |
| Peel Force (lbs/in) | 0 | 0 | 0 | 0 | 0 |
| Shore A Hardness 23° C. | 71 | 71 | 73 | 70 | 82 |
| Compression Set % 22 hrs 158° F. | 18.4 | 16.0 | 16.7 | 12.0 | 24.8 |
| Ring Stress Strain ASTM 25° C. D412 | | | | | |
| 100% | 436 | 483 | 405 | 409 | 655 |
| 300% | 1473 | 1436 | 1208 | 1319 | 1488 |
| Tensile (psi) | 1835 | 1696 | 1485 | 1685 | 1523 |
| % Elongation | 494 | 459 | 488 | 505 | 379 |
| Energy to break (psi) | 2407 | 2102 | 1943 | 2268 | 1635 |
| Ring Stress Strain 100° C. ASTM D-412 | | | | | |
| 100% Modulus (psi) | 336 | 331 | 347 | 310 | 309 |
| Tensile (psi) | 1057 | 1012 | 981 | 960 | 861 |
| % Elongation | 323 | 321 | 312 | 320 | 336 |
| Ring Stress Strain After 2 days 150° C. | | | | | |

TABLE V-continued

EXAMPLES EPICHLOROHYDRIN RUBBER

| Sample | K | L | M | N | O |
| --- | --- | --- | --- | --- | --- |
| 100% Modulus (psi) | 605 | 881 | 975 | 794 | 1442 |
| Tensile (psi) | 914 | 1232 | 1202 | 1158 | 1514 |
| % Elongation | 250 | 210 | 182 | 234 | 150 |
| Energy to break (psi) | 742 | 805 | 665 | 752 | 574 |

Hydrin ™ is Epichlorohydrin rubber from Nippon Zeon. This one is a homopolymer of epichlorohydrin rather than a copolymer.
SAN/EPDM is a graft of SAN onto EPDM. It is Royaltuf ™ 372 available from Uniroyal.
$BaCO_3$ is a blend of predominantly $BaCO_3$ masterbatched in rubber.
CI Resin is coumarone-indene processing resin. Accelerator III is Rhenofit, a mixture of urea and sulfamic acid bonded to silica.

The examples A, B, C, and D of Table I using a brominated copolymer of p-methylstyrene-isobutylene reacted with poly(ethylene glycol) showed good release (lbs/in peel force) in the Peel Force Test at two different concentrations of PEG-400 (poly(ethylene glycol)). Examples B, C, and D show the substitution of EPDM and liquid EPDM for the XP-50BR still gives good release properties. The example compounds show good retention of physical properties even after heat aging. Thus, the grafted polar units have not significantly affected the physicals while they significantly enhanced the release.

The example of maleic anhydride modified EPDM (Table II) showed that Sample E, a compound without the polar polymer grafted onto the maleic anhydride modified EPDM did not release from the butyl rubber innerliner material in the peel test. The measured peel force was in excess of 20 lbs/inch of peel interface. Samples with the polar PEG-8000 grafted onto the modified EPDM (Samples F, G, and H) showed release and peel forces of less than 3 lbs/in. Samples G and H showed good physical properties for this application and good heat aging characteristics.

Sample I of nitrile rubber (Table III) showed excellent release and no adhesion in the peel test. The physical properties and heat aging are acceptable up to 120° C.

The control sample J of butyl rubber (Table IV) without any polar polymers or polar polymers grafted to hydrocarbon polymer backbones showed no release from a butyl rubber innerliner in the peel force test. The peel force was in excess of 100 lbs/in and showed tearing in the rubber rather than at the interface between the two compounds.

The samples K-0 of epichlorohydrin rubber (Table V) showed release in peel force test. They had approximately 0 lbs/in peel force. Example 0 showed that blends of Hydrin™ rubber with SAN/EPDM also give good release properties and low peel force. The physical properties of these polymers were in the range necessary for curing bladders.

The utility of these disclosed polymers, copolymers, and graft copolymers having low adhesion to hydrocarbon rubbers like butyl rubber innerliners is to make curing bladders, sleeves, or other shaped polymer products especially those shaped products to be used in molding, shaping and curing hydrocarbon rubber compounds. The disclosed polymers have low adhesion to the cured hydrocarbon rubbers saving the necessity of applying lubricants to the interface between the molding device (such as a curing bladder) and the hydrocarbon rubber compound to be cured. They also eliminate the need for applying surface layers (i.e. making laminates) of polymers such as crosslinkable polysiloxanes or polyurethanes. They also eliminate the need for chemically attached polysiloxane polymers. These polysiloxane polymers are attached via a reaction of unsaturation present on the polysiloxane. This technology is taught by U.S. Pat. No. 4,710,541, which is hereby incorporated by reference. The shaped articles and curing bladders or sleeves disclosed are useful in assembling, forming, and curing hydrocarbon based rubber materials.

While in accordance with the Patent Statutes, the best mode and preferred embodiment has been set forth, the scope of the invention is not limited thereto, but rather by the scope of the attached claims.

What is claimed is:

1. In a curing press for hydrocarbon based rubbers of the type which uses an inflatable bladder or sleeve
   wherein the bladder or sleeve has:
   an ultimate tensile strength of 1500 psi or more and a 300 percent modulus of 500–1000 psi, wherein said bladder or sleeve retains a capability to achieve 300 percent elongation after 48 hours at 121° C., and wherein said bladder or sleeve has surfaces having crosslinked polymers therein, the improvement wherein said crosslinked polymers before crosslinking comprise:
   a reaction product comprising
   (a) a rubber selected from at least an ethylene propylene terpolymer, substantially hydrogenated polybutadiene, or substantially hydrogenated styrene-butadiene rubber, and
   (b) maleic anhydride and which reaction product is melt blended with a polar polymer under shear at temperatures from about 90° C. to about 220° C.;
   wherein said polar polymer is at least one polymer or copolymer of polyether, polyester, or polycarbonate from the reaction of phosgene with glycols having from about 1 to about 4 carbon atoms wherein said polar polymer is from about 2 to about 40 weight percent of the total rubbers in said bladder or sleeve.

2. In a curing press according to claim 1, wherein said rubber comprises an ethylene-propylene terpolymer.

3. In a curing press according to claim 2, wherein the amount of said maleic anhydride is from about 1 to about 20 parts by weight per one hundred parts by weight of said rubber, and wherein the amount of said polar polymer is from about 5 to about 30 weight percent based upon the total of said polar polymer and said reaction product.

4. In a curing press according to claim 1, wherein said rubber comprises a polybutadiene hydrogenated to remove from about 90 to about 99.5 percent of the unsaturation.

5. In a curing press according to claim 4, wherein the amount of said maleic anhydride is from about 1 to about 20 parts by weight per one hundred parts by weight of said rubber, and wherein the amount of said polar polymer is from about 5 to about 30 weight percent based upon said polar polymer and said reaction product.

6. In a curing press according to claim 1, wherein said rubber comprises a styrene-butadiene rubber hydrogenated to remove from about 90 to about 99.5 percent of the unsaturation.

7. In a curing press according to claim 6, wherein the amount of said maleic anhydride is from about 1 to about 20 parts by weight per one hundred parts by weight of said rubber, and wherein the amount of said polar polymer is from about 5 to about 30 weight percent based upon the total of said polar polymer and said reaction product.

8. In a curing press according to claim 1, wherein said polar polymer is one or more polyethers polymerized from ethylene oxide, propylene oxide, tetramethylene oxide, or combinations thereof.

9. In a curing press according to claim 1, wherein said polar polymers are polyesters polymerized from cyclic lactones.

10. In a curing press according to claim 8, wherein said polar polymer is from about 5 to about 30 weight percent of the total of said reaction product and said polar polymer.

11. In a curing press according to claim 9, wherein said polar polymer is from about 5 to about 30 weight percent of the total of said reaction product and said polar polymer.

12. In a curing press according to claim 10, further comprising a liquid interface lubricant on said bladder or sleeve.

13. In a curing press for hydrocarbon based rubbers including a vulcanized monolayer curing bladder or sleeve having its entirety comprised of a single crosslinked elastomeric composition, wherein the bladder or sleeve retains its elasticity to 300 percent elongation for at least 48 hours at 121° C., the improvement wherein the elastomeric composition before curing comprises:
   a reaction product comprising
       (a) a rubber of ethylene propylene terpolymer, substantially hydrogenated polybutadiene, or substantially hydrogenated styrene-butadiene rubber, with
       (b) maleic anhydride and
   which reaction product is melt blended with a polar polymer under shear at temperatures from about 90° C. to about 220° C.; wherein said polar polymer is at least one polymer or copolymer of polyether, polyester, or polycarbonate from the reaction of phosgene with glycols having from about 1 to about 4 carbon atoms wherein said polymer is from about 2 to about 40 weight percent of the total rubbers of said curing bladder or sleeve.

14. In a curing press according to claim 13, wherein the amount of said maleic anhydride is from about 1 to about 20 parts by weight per 100 parts by weight of said rubber and wherein the amount of said polar polymer is from about 5 to about 30 weight percent based upon the total of said polar polymer and said reaction product.

15. In a curing press according to claim 14, wherein the reaction of said rubber with maleic anhydride is conducted at a temperature from about 50° to about 180° C. for a period of time from about 0.1 to about 24 hours with from about 0.01 to about 5 parts by weight free radical initiator per 100 parts by weight of said rubber.

16. In a curing press according to claim 15, wherein said rubber is an ethylene-propylene terpolymer.

17. In a curing press according to claim 15, wherein said rubber comprises a polybutadiene hydrogenated to remove from about 90 to about 99.5 percent of the unsaturation.

18. In a curing press according to claim 15, wherein said rubber comprises a styrene-butadiene rubber hydrogenated to remove from about 90 to about 95 percent of the unsaturation.

19. In a curing press according to claim 15, wherein said polar polymer comprises one or more polyethers polymerized from ethylene oxide, propylene oxide, tetramethylene oxide, or combinations thereof.

20. An inflatable curing bladder or sleeve for use in vulcanizing and molding hydrocarbon materials comprising;
   a bladder or sleeve having at least one exterior surface exhibiting low adhesion with said hydrocarbon materials after vulcanization of said hydrocarbon materials, said bladder or sleeve, and said at least one exterior surface of said bladder or sleeve comprising the reaction product of one or more of rubbers selected from ethylene-propylene terpolymer, substantially hydrogenated polybutadiene, and substantially hydrogenated styrene-butadiene copolymer rubber reacted with maleic anhydride and subsequently melt blended with from about 2 to about 100 parts by weight polar polymers per 100 parts by weight of said one or more rubbers.

21. An inflatable curing bladder or sleeve according to claim 20, wherein said bladder or sleeve comprises said reaction product of melt blending of one or more brominated p-methyl-styrene-isobutylene copolymers with one or more polar polymers
   wherein said one or more polar polymers comprise at least one polymer or copolymer of polyether, polyester or polycarbonate from the reaction of phosgene with glycols having from about 1 to about 4 carbon atoms, and
   wherein said one or more polar polymers are from about 2 to about 40 weight percent of the total rubbers in said bladder or sleeve.

22. An inflatable curing bladder or sleeve according to claim 21, wherein said polyethers have from 1 to 4 carbon atoms per repeat unit and said polyester is from the ring opening polymerization of cyclic lactones having from 4 to 5 carbon atoms and wherein said one or more polar polymers are from about 2 to about 40 weight percent of the total rubbers in said bladder or sleeve.

23. An inflatable curing bladder or sleeve according to claim 22, wherein said reaction product comprises graft copolymer having grafts of said one or more polar polymer and a backbone of p-methylstyrene-isobutylene copolymer.

* * * * *

UNITED STATES PATENT AND TRADEMARK OFFICE
CERTIFICATE OF CORRECTION

PATENT NO. : 5,527,170
DATED : June 18, 1996
INVENTOR(S) : Daniel F. Graves and William L. Hergenrother It is certified that error appears in the above-indentified patent and that said Letters Patent is hereby corrected as shown below:

Please delete in column 16, lines 25-48.

Signed and Sealed this

Fifteenth Day of April, 1997

Attest:

BRUCE LEHMAN

Attesting Officer     Commissioner of Patents and Trademarks